United States Patent [19]

Schmidt

[11] Patent Number: 5,006,191

[45] Date of Patent: Apr. 9, 1991

[54] METHOD OF PRODUCING A LABEL-PROVIDING CONTINUOUS BUSINESS FORM

[75] Inventor: Eric R. Schmidt, Elgin, Ill.

[73] Assignee: Wallace Computer Services, Inc., Hillside, Ill.

[21] Appl. No.: 367,891

[22] Filed: Jun. 19, 1989

Related U.S. Application Data

[63] Continuation-in-part of Ser. No. 178,497, Apr. 7, 1988, Pat. No. 4,865,669.

[51] Int. Cl.$^5$ .............................................. B32B 31/10

[52] U.S. Cl. .................................... 156/268; 156/270; 156/289; 156/304.3; 156/304.5; 281/29; 428/40; 428/41; 428/58

[58] Field of Search ............... 156/157, 204, 226, 227, 156/258, 257, 268, 304.3, 304.5, 270, 289; 40/388, 394, 397; 281/23, 29; 428/40, 41, 58, 77, 189

[56] References Cited

U.S. PATENT DOCUMENTS

| | | | |
|---|---|---|---|
| 3,111,449 | 11/1963 | Gold et al. | 428/40 |
| 3,199,896 | 8/1965 | Caddoo | 281/29 |
| 3,425,617 | 2/1969 | Gerald | 281/29 |
| 3,895,990 | 7/1975 | Josteit | 156/304.3 |
| 4,388,134 | 6/1983 | Long et al. | 156/304.3 |
| 4,517,044 | 5/1985 | Arnold | 156/289 |
| 4,544,590 | 10/1985 | Egan | 428/41 |
| 4,627,994 | 12/1986 | Welsch | 428/41 |
| 4,696,843 | 9/1987 | Schmidt | 428/189 |
| 4,865,669 | 9/1989 | Schmidt | 156/91 |

*Primary Examiner*—Caleb Weston
*Attorney, Agent, or Firm*—Tilton, Fallon, Lungmus & Chestnut

[57] ABSTRACT

The invention consists of a method which provides a business form with removable labels. This method produces a business form which maintains its integrity and does not jam or damage production or processing equipment. It includes providing a first web with a bottom release ply, a top label stock ply and adhesive disposed between these two plies for releasably joining the two together. It also provides a second web and places it in side-by-side laterally spaced relation with the first web. The method further includes the step of adhering a splicing strip to the first and second webs to join them together. The resulting form includes the first and second webs disposed in spaced, side-by-side relation. It also includes the splicing strip adhered to the inner edge portions of the first and second webs to connect the first and second webs together.

5 Claims, 2 Drawing Sheets

METHOD OF PRODUCING A LABEL-PROVIDING CONTINUOUS BUSINESS FORM

This application is a continuation-in-part of application Ser. No. 178,497, filed Apr. 7, 1988, U.S. Pat. No. 4,865,669 for a "Method Of Making Business Forms With Removable Labels".

BACKGROUND OF THE INVENTION

1. Field of the Invention

The present invention relates to a continuous business form and a method of making it and more specifically, to a continuous business form which includes two continuous webs spliced together and a method of making it.

2. Description Of The Prior Art

An increasing demand has developed for continuous business forms which include removable labels and corresponding segments for recording information relating to the label. To meet this demand profitably, a manufacturer must use high speed operations for constructing these forms quickly and efficiently. Consequently, the methods used must not require precise placement of the component parts of the form or need other similar constraints which reduce the speed of operation and increase the cost of the resulting form.

Prior methods typically place a release ply side-by-side with a record ply, join these two plies together with a ply of label stock, and cut the label stock to define one or more labels and a matrix surrounding the labels. The matrix maintains the connection between the release ply and the record ply with the pressure sensitive adhesive which remains on the labels when the user removes them from the release ply.

Using the label stock matrix to splice the various components of the form together presents problems, especially where the label stock is fragile and the pressure sensitive adhesive releases easily. Moreover, the manufacturer cannot easily control the width of the business form independently of the width of the label stock portion which maintains the connection between the release and record plies. In addition, the manufacturer cannot easily vary the width of the removable label. The method of the present invention avoids the shortcomings of the prior methods and produces a continuous business form quickly and efficiently. The business form which it produces is a simple and durable construction which does not jam or damage the machinery which makes it and which uses it.

SUMMARY OF THE INVENTION

In a preferred embodiment, the method of the present invention provides a first web composite including a top label stock ply, a release ply disposed below the label stock ply and adhesive disposed between the two plies and joining them together. The method includes the steps of cutting the label ply into label segments and a surrounding matrix, removing the matrix, and forming control openings into the release layer along one of its side edges. Preferably, the surrounding matrix has a ladder-like configuration to allow continuous removal of the matrix from the first composite web. Alternatively, the matrix may remain on the first web.

The method of the present invention also includes providing a second web and placing it side-by-side with the first web. The second web is a ply of paper stock suitable for receiving printed matter which relates to the corresponding labels. Finally, the method includes adhering an elongate and continuous splice strip to the inner edge portions of the first and second webs to connect the first and second webs together, and perforating the resulting continuous form transversely at predetermined intervals to define individual form lengths.

Alternatively, the second web may be a composite web including a top label stock ply and a bottom release ply, joined together with adhesive disposed between them; and the method may further include the steps of cutting the label ply into segments and the surrounding matrix and removing the matrix.

The method of the present invention provides a splice strip at the inner edge portions of the first and second web on the face of the release ply opposite the face supporting the labels and the pressure sensitive adhesive. However, the method may also secure the splice to the edge portions of the label stock by first slitting and removing an inner edge segment of the release ply.

The method of the present invention provides a continuous business form which includes the first and second webs disposed in spaced, side-by-side relation. It also includes a splicing strip adhered to the inner edge portions of the first and second webs to connect the first and second webs together. Lines of perforation or any other suitable lines of weakening disposed transversely of the webs and splice strip at predetermined intervals define individual form lengths.

BRIEF DESCRIPTION OF THE DRAWINGS

For a more complete understanding of the present invention, one should now refer to the embodiments illustrated in greater detail in the accompanying drawings and described below as examples of the invention. In the drawings.

DETAILED DESCRIPTION OF THE DRAWINGS

Figure 1:
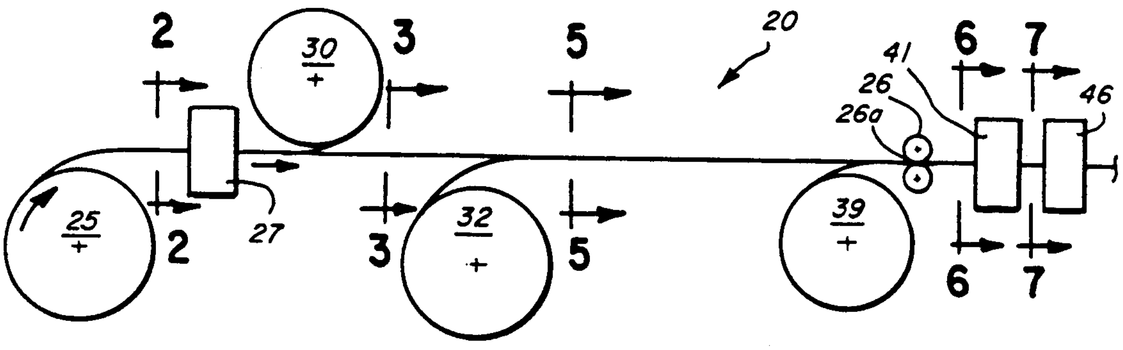
FIG. 1 is a schematic side elevation view of a production line which produces continuous business forms with releasable labels in accordance with the present invention.
Figure 2:
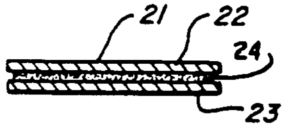
FIG. 2 is a sectional view taken along line 2—2 in FIG. 1 and showing a first composite web.

In the illustration given and with reference to FIG. 1, the numeral 20 designates generally a continuous business form production line. Co-pending application Ser. No. 178,497, filed Apr. 7, 1988, for a "Method of Making Business Forms With Removable Labels" discloses such a production line; and the applicant incorporates the disclosure of that application to this disclosure by reference. The form produced by the line 20 includes a composite web generally designated 21 (See FIG. 2) with a top label stock ply 22, a bottom release ply 23 and a pressure sensitive adhesive 24 disposed between the top and bottom plies (a) for joining the two plies together, and (b) for providing adhesive for the removable labels formed as described below.

The label stock ply may be paper or other suitable material which can receive printed information. Similarly, the release ply 24 may be any suitable paper material coated with any one of a variety of known waxy substances, e.g., silicone. These substances facilitate the peeling away of the label ply and allow the adhesive to have a greater affinity for the label stock ply. Alternatively, the release ply 23 may be any suitable synthetic (e.g., plastic) material. Finally, the adhesive 23 may be any suitable pressure sensitive adhesive.

Figure 5:
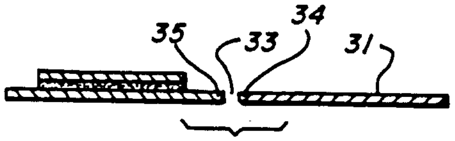
FIG. 5 is a sectional view taken along line 5—5 in FIG. 1 and showing the first web and a second web.
Figure 3:
FIG. 3 is a sectional view taken along line 3—3 in FIG. 1 and showing the first web.
Figure 4:
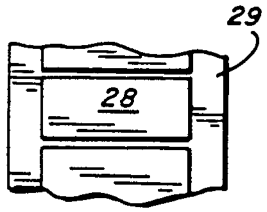
FIG. 4 is a fragmentary top plan view of the first web of FIG. 3.

The web 21 unwinds from supply roll 25 and advances along a predetermined path down the production line 20 through suitable pull rolls as at 26. At station 27, a convenient die cutting mechanism or other similar mechanism cuts the top label stock ply 22 into individual labels 28 (See FIG. 5) and a surrounding matrix 29 which has a general ladder-like configuration. Further down the production line, the matrix 29 releases from the composite web 21 under the pulling force applied by driven waste roll 30. Since the adhesive 24 has a greater affinity for the label stock ply 22, the matrix 29 takes, along with it, the adhesive which lies between it and the release ply 23. (See FIG. 4) Alternatively, the method may not include the step of removing the matrix 29.

The method of the present invention provides a second web generally designated 31; unwinds it from a supply roll 32; and advances it down the production line in spaced, side-by-side relation with the first web 21, leaving a gap 33 between an inside edge 34 of the second web 31 and the inside edge 35 of the web 21. (See FIG. 5) This gap 33 accommodates variances in the widths of the two webs 21 and 31 and prevents any overlap of the webs due to such variances. The second web 31, in the illustrated embodiment, is a web of any suitable paper stock which may easily receive printed information on its surface. It serves as a record portion of a business form produced by the process of the present invention.

The two webs 21 and 31 advance further down the production line and, at the pressure nip 26*a*, defined by the two pressure rolls 26, the two webs 21 and 31 receive a splice strip 38 which joins the two webs 21 and 31 together. The splice strip 38 is paper or any other suitable material. It unwinds from supply roll 39 and bridges the gap between the inside edges 34 and 35 of the webs 31 and 21, respectively. An adhesive 40 firmly secures the splice 38 to the webs 21 and 31 to join these two webs together. This adhesive is a permanent pressure sensitive adhesive (e.g., S D Warren P237) or any similar adhesive.

Figure 6:
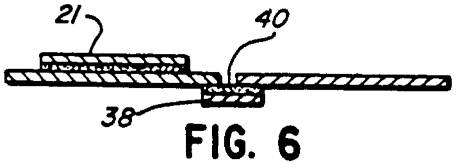
FIG. 6 is a sectional view taken along line 6—6 in FIG. 1 and showing the first and second webs joined by a splice strip.
Figure 7:
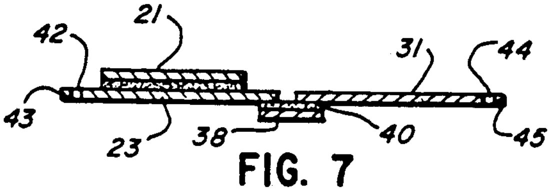
FIG. 7 is a sectional view taken along line 7—7 in FIG. 1 and showing the first and second webs with control openings formed in them.

As shown in FIGS. 6 and 7, the splice 38 lies below the webs 31 and 21 and contacts the release ply 23 of the web 21 on the face opposite the face which supports the adhesive 24 and the label stock ply 22. As further shown by FIG. 6, the splice 38 does not overlap with the labels 28 which remain after removal of the ladder-like matrix 29. However, the splice may extend below the labels; and it does lie below the matrix 29 in alternatives which do not require removal of the matrix 29.

At station 41, a conventional hole punch mechanism forms one control opening 42 along an outer edge 43 of the release layer 23 and a second control opening 44 along an outer edge 45 of the web 31. (See FIG. 7) With these openings or margin line holes 42 and 44, business equipment which uses the business form provided by the process of the present invention advances the form to process it.

Figure 8:
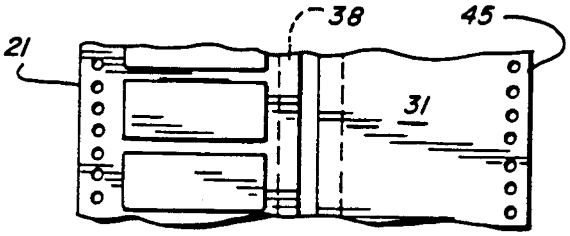
FIG. 8 is a fragmentary top plan view of the business form shown in FIG. 7 and provided by the method of the present invention.

FIG. 8 shows the business form 45 which the method of the present invention produces. As described above, the form includes the first and second webs, 21 and 31, disposed in spaced, side-by-side relation and joined by the strip 38 which engages the adjacent edge portions of the webs. This form maintains its integrity because the strip 38 firmly secures the two webs 21 and 31 together without relying on pressure sensitive adhesive 24. Conventional slitting apparatus forms a perforation transversely across this business form at station 46; and other suitable folding and stacking apparatus prepare the form for marketing.

Figure 9:
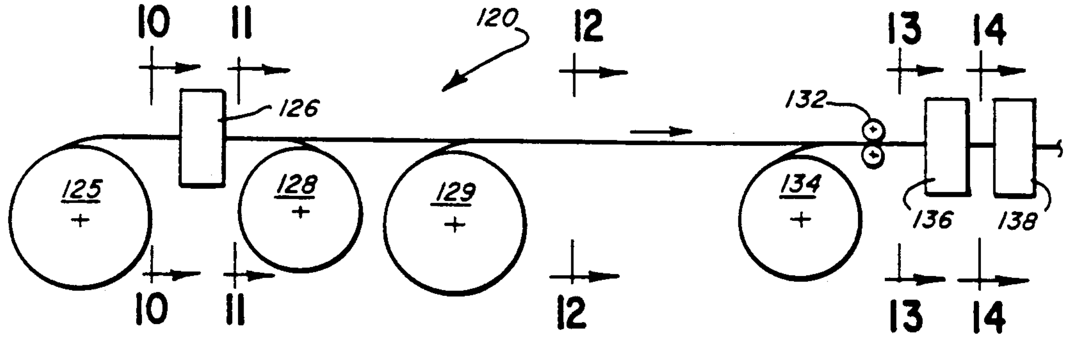
FIG. 9 is a schematic side elevation view of a modified production line which produces a modified continuous business form in accordance with the method of the present invention.
Figure 10:
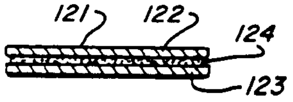
FIG. 10 is a sectional view taken along line 10—10 in FIG. 9 and showing a first composite web.

FIG. 9 shows an alternative embodiment which includes providing a first web 121 (like the web 21) with a top label stock ply 122, a bottom release ply 123, and pressure sensitive adhesive 124 disposed between the top and bottom plies for joining the two together and for providing adhesive for the label stock ply 122.

The production line 120 shown in FIG. 9 receives the web 121 from a supply roll 125. A cutting mechanism at station 126 slits the release ply 123 into a main body segment 127 and an edge segment (not shown) which releases into waste roll 128 for disposal.

A supply roll 129 provides a second web 130 which advances down the production line in spaced, side-by-side relation to the web 121, leaving a gap 131 between the inside edge of the second web and the inside edge of the first web 121. (See FIG. 13) This gap 131 accommodates variances in the widths of the two webs 121 and 130 and prevents any overlap of the two webs due to such variances. The web 130, like the web 31 described above, is a web of any suitable paper stock which may easily receive printed information on its surface.

Figure 13:
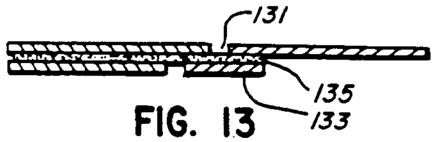
FIG. 13 is a sectional view taken along line 13—13 in FIG. 9 and showing the first and second webs joined by a splice strip.
Figure 11:
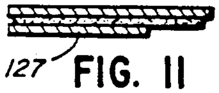
FIG. 11 is a sectional view taken along line 11—11 in FIG. 9 and showing the first web.
Figure 14:
FIG. 14 is a sectional view taken along line 14—14 in FIG. 9 and showing the first and second webs with control openings formed in their outer edge portions.
Figure 12:
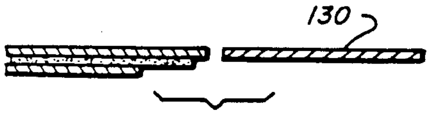
FIG. 12 is a sectional view taken along line 12—12 in FIG. 9 and showing the first web and a second web.

The two webs 121 and 130 advance further down the production line, and, at a pressure nip defined by two pressure rolls 132, the two webs 121 and 130 receive a splice strip 133 which joins the two webs together. This strip 133 is made of paper or any other suitable material. The splice strip 133 unwinds from supply roll 134 and includes a layer of adhesive 135. It bridges the gap 131 between the inside edges of the webs 121 and 130; and the adhesive 135 firmly secures it to the webs 121 and 130 to join the two webs together. The splice 133 lies below the web 130 and label stock ply 122 as shown in FIG. 13 and side-by-side with release ply 123. It firmly secures the label stock ply 122 and the web 130 together At station 136, a conventional hold punch mechanism forms one control opening along the outer edge of the web 121 and control openings along the outer edge of the web 130. (See FIG. 14) With these openings or margin line holes, business equipment which uses the business form provided by the process of the present invention advances the form to process it.

Figure 15:
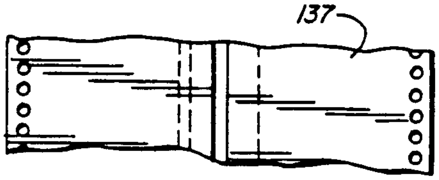
FIG. 15 is a fragmentary top plan view of the business form provided by the method of the present invention and shown in FIG. 14.

FIG. 15 shows the business form 137 produced by the production line 120 and described above. The materials used to construct this form are similar to those used to construct the form 45. The form 137 includes two webs, the first web 121 and the second web 131, disposed in spaced, side-by-side relation and joined by the strip 133 which engages the adjacent edge portions of the two webs. The strip 133 provides a secure connection between the label stock ply 122 and the web 130 for applications which require that the record ply 130 remain with the label stock ply 122. Conventional slitting apparatus or similar apparatus form a perforation line or any other line of weakening transversely across this business form at station 138 to define individual form lengths. Other suitable folding and stacking apparatus prepare the form for marketing.

Figure 16:
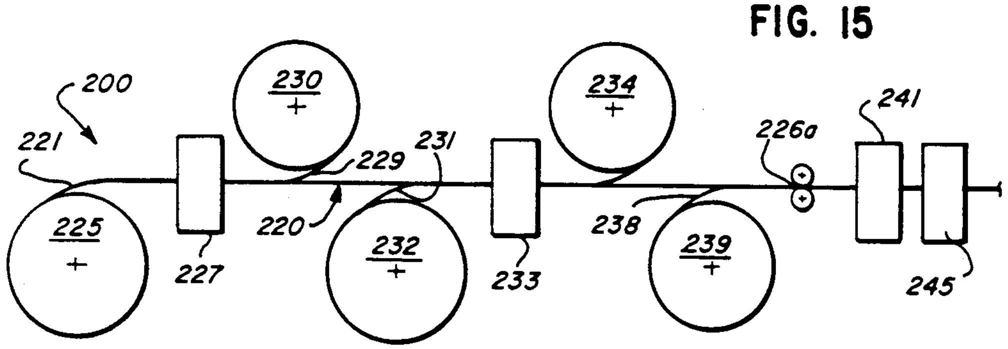
FIG. 16 is a schematic side elevation view of another modified production line which produces another modified continuous business form in accordance with the method of the present invention.
Figure 17:
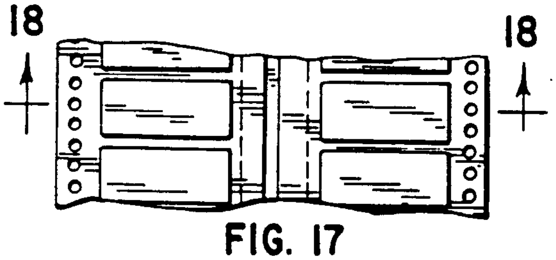
FIG. 17 is a fragmentary top view of the modified continuous business form produced by the production line shown in FIG. 16.

FIG. 16 shows another alternative embodiment which processes a first web 221 and a second web 231. Each of the webs in this alternative, like the web 21 described above, comprise a bottom release ply, a top label stock ply and adhesive disposed between the two and joining them together. To produce the web shown in FIGS. 17 and 18, the production line 220 shown in FIG. 16 includes a supply roll 225 which provides the first web 221. A die cutting mechanism at station 227 cuts this web into labels and the surrounding matrix 229 which releases into waste roll 230 for disposal.

A supply roll 232 provides the second web 231 which advances down the production line in side-by-side, spaced relation to the web 221 At station 233 a die cutting device or other suitable mechanism cuts the second web into label portions and the surrounding matrix having a general ladder-like configuration. A waste roll 234 receives this matrix along with the adhesive disposed beneath it. The two webs 221 and 231 advance further down the production line and at pressure nip 226a they receive a splice strip 238 from supply roll 239.

Figure 18:
FIG. 18 is a sectional view taken along line 18—18 in FIG. 17.

This splice strip 238 is made of paper or any other suitable material, and it bridges the gap between the two webs 221 and 231 and joins the two webs together. It does this with an adhesive 240 which firmly secures the strip 238 to the webs 221 and 231. The splice strip lies below the release plies of the two webs as shown in FIG. 18 and engages the surface of the release plies opposite the surface which supports the labels and the pressure adhesive.

At station 241, the first web 221 receives control punches along its outer edge; and the second web 231 also receives control punches along its outer edge. The resulting business form (See FIGS. 17 and 18 and the description above) includes the two webs 221 and 231 disposed in spaced, side-by-side relation and joined by the strip 238 which engages the adjacent edge portions of the two webs. The materials used to construct this form are similar to those used to fabricate the form 45.

At station 245, the resulting form receives transverse perforations or any other line of weakening. Other folding, sheeting or rewinding steps and packaging procedures may further prepare the business forms for marketing.

Thus, the applicant has provided a method which allows produces business forms with labels of any suitable material and provide the labels with any desired pressure sensitive adhesive. While the applicant has shown three embodiments, one will understand, of course, that the invention is not limited to these embodiments as those skilled in the art to which the invention pertains may make modifications and other embodiments of the principles of the invention, particularly upon considering the foregoing teachings. The applicant, therefore by the appended claims, intends to cover any modifications and other embodiments and incorporate those features which constitute the essential features of the invention.

What is claimed is:

1. A method of producing a label-providing continuous business form comprising the steps of: advancing a composite first web along a predetermined path, said composite web including a bottom release ply, a top label stock ply, and an adhesive layer therebetween; advancing a second web in said path in spaced relation to said composite web and in co-planar relationship to said composite web; adhering a continuous splicing strip to said composite and second webs in the edge portions adjacent each other to provide a label supplying business form; removing a continuous portion of said top label stock ply of said first web.

2. The method of claim 1 further comprising removing an edge portion of said release ply of said first web and adhering said splicing strip to said label stock ply of said first web in the area occupied by said removed edge portion.

3. The method of claim 1 in which said second web also includes a top label stock ply and in which a continuous portion of said second web top label ply is removed.

4. The method of claim 1 in which said splicing strip is adhered to the edge portion of said release ply of said first web, on the surface opposite the surface with the adhesive layer.

5. The method of claim 1 in which said second web also includes a top label stock ply, a release ply and an adhesive layer therebetween and in which said splicing strip is adhered to the edge portion of said release ply of said first and second web, on the surface of the release plies opposite the surfaces with the adhesive layer.

* * * * *